United States Patent
Briehn et al.

(10) Patent No.: US 8,084,531 B2
(45) Date of Patent: *Dec. 27, 2011

(54) PARTICLES WITH PROTECTED ISOCYANATE GROUPS

(75) Inventors: Christoph Briehn, Munich (DE); Torsten Gottschalk-Gaudig, Mehring (DE); Juergen Pfeiffer, Burghausen (DE); Volker Stanjek, Munich (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 954 days.

This patent is subject to a terminal disclaimer.

(21) Appl. No.: 11/573,751

(22) PCT Filed: Aug. 4, 2005

(86) PCT No.: PCT/EP2005/008461
§ 371 (c)(1),
(2), (4) Date: Feb. 15, 2007

(87) PCT Pub. No.: WO2006/018144
PCT Pub. Date: Feb. 23, 2006

(65) Prior Publication Data
US 2008/0028983 A1    Feb. 7, 2008

(30) Foreign Application Priority Data
Aug. 19, 2004 (DE) .................. 10 2004 040 264

(51) Int. Cl.
*C08K 3/34* (2006.01)

(52) U.S. Cl. .......................... 524/492; 528/38

(58) Field of Classification Search ............ 524/492; 528/38
See application file for complete search history.

(56) References Cited

U.S. PATENT DOCUMENTS

| | | | | |
|---|---|---|---|---|
| 4,719,267 A | * | 1/1988 | Rizk et al. | 525/453 |
| 5,998,504 A | * | 12/1999 | Groth et al. | 523/213 |
| 2004/0220419 A1 | * | 11/2004 | Gottschalk-Gaudig et al. | 556/10 |

FOREIGN PATENT DOCUMENTS

| | | |
|---|---|---|
| CA | 2501336 A1 | 4/2004 |
| DE | 3424534 A1 | 1/1986 |
| DE | 1247359 A | 4/2004 |
| EP | 0212058 B1 | 1/1990 |
| EP | 832 947 * | 4/1998 |
| EP | 0 872 500 A1 | 10/1998 |
| EP | 1187885 A | 3/2002 |
| EP | 129 470 * | 10/2002 |
| JP | 08-291186 | 11/1996 |
| JP | 10-067787 | 3/1998 |
| JP | 2004143307 A | 5/2004 |
| WO | WO 01/05897 | 1/2001 |
| WO | WO 03/016370 | 2/2003 |

OTHER PUBLICATIONS

Amida et al. Eur. J. Org. Chem., (2004) 2582-1588.*
English Patbase Abstract corresponding to EP-A 1249470.
English Patbase Abstract corresponding to WO 03/16370.
English Patbase Abstract corresponding to EP-A 832947.
English Patbase Abstract corresponding to EP-A 1187885.
English Patbase Abstract corresponding to WO 01/05897.
English Patbase Abstract corresponding to DE-A 3424534.
English Patbase Abstract corresponding to EP-B 0212058.
English Patbase Abstract corresponding to EP-A 872500.
English Patent Abstract of Japan corresponding to JP 08-291186.
English Patent Abstract of Japan corresponding to JP 10-067787.

* cited by examiner

*Primary Examiner* — Kuo-Liang Peng
(74) *Attorney, Agent, or Firm* — Brooks Kushman P.C.

(57) ABSTRACT

Particles useful in curable coating systems are functionalized on their surface with a blocked isocyanate functionality. The blocked isocyanate is generated by reacting an organosilane having an oxygen, sulfur or nitrogen atom α to the silyl group, or having a cyclic structure containing N or O in the ring, attached directly to silicon.

12 Claims, No Drawings

PARTICLES WITH PROTECTED ISOCYANATE GROUPS

CROSS-REFERENCE TO RELATED APPLICATION

This application is the U.S. national phase of PCT Appln. No. PCT/EP2005/008461 filed Aug. 4, 2005 which claims priority to German application 10 2004 040 264.7 filed Aug. 19, 2004.

BACKGROUND OF THE INVENTION

1. Field of the Invention

The invention relates to particles having protected isocyanate groups on their surface, to a process for preparing them, and to coating formulations comprising said particles.

2. Description of the Related Art

Coating systems comprising particles—especially nanoparticles—are state of the art. Such coatings are described for example in EP 1 249 470 A2 or WO 03/16370. The particles in these coatings lead to an improvement in the properties of the coatings, particularly with regard to their scratch resistance and also their chemical resistance.

A frequently occurring problem associated with the use of the—generally inorganic—particles in organic coating systems consists in a usually inadequate compatibility between particle and coating-material matrix. This can lead to the particles being insufficiently dispersible in a coating-material matrix. Moreover, even well-dispersed particles may undergo settling in the course of prolonged standing or storage times, with the formation, possibly, of larger aggregates or agglomerates, which even on redispersion are then impossible or difficult to separate into the original particles. The processing of such inhomogeneous systems is extremely difficult in any case, and is often in fact impossible.

Favorable, therefore, is the use of particles which on their surface possess organic groups that lead to improved compatibility with the coating-material matrix. In this way the inorganic particle becomes "masked" by an organic shell. Particularly favorable coating-material properties can be achieved in this context if, furthermore, the organic functions on the particle surfaces also possess groups that are reactive toward the coating-material matrix, so that under the respective curing conditions of the coating material in question they are able to react with the matrix. In this way, success is achieved in incorporating the particles into the matrix chemically in the course of coating-material curing, which often may result in particularly good mechanical properties but may also result in improved chemical resistance. A system of this kind is described for example in EP 832 947 A.

Also known, furthermore, is the use of coatings comprising a binder which has been modified with nanoparticles. They can be prepared by reacting a particle equipped with a reactive functionality with a binder that carries a complementary function. Here, in other words, the organofunctional particle is incorporated chemically into the coating-material matrix not only on curing of the coating material but already at the binder preparation stage. Systems of this kind are described for example in EP 1 187 885 A or WO 01/05897.

In the case of one particularly important type of coating material, a film-forming resin is used which comprises hydroxy-functional polymers which, on curing of the coating material, are reacted with an isocyanate-functional curative. These polyurethane coating materials are notable for particularly good properties, such as a superior chemical resistance, but there is still a need for improvement, particularly as regards the scratch resistance of these systems. Typically they are used in particularly high-value and high-price fields of application: for example, as clearcoats or topcoats for OEM finishes in the automobile and vehicle industry. In addition, the majority of refinish coating materials for automobile repairs are composed of isocyanate-curing systems of this kind.

Typically a distinction is made between two different polyurethane coating systems, known as 2K and 1K systems. The former consist of two components, one of which is composed essentially of the isocyanate curative, while the film-forming resin with its isocyanate-reactive groups is contained in the second component. The two components must be stored and transported separately and should not be mixed until shortly before they are processed, since the completed mixture has only a greatly limited pot life. Often more favorable here are the so-called 1K systems, composed of just one component, in which alongside the film-forming resin there is a curative containing protected isocyanate groups. 1K coating materials are cured thermally, the protective groups of the isocyanate units being eliminated, with the deprotected isocyanates being able then to react with the film-forming resin. Typical baking temperatures of such 1K coating materials are situated at 130-150° C.

Particularly in the case of these high-value coating materials a further improvement in properties would be desirable. This is so in particular for vehicle finishes, both in the OEM and in the refinish segments. For instance, the achievable scratch resistance of conventional auto finishes, in particular, is still not sufficient, with the consequence, for example, that particles in the wash water in a car wash lead to significant marring of the finish. Over time, this causes lasting damage to the gloss of the finish. In this situation, formulations that allow higher scratch resistances to be achieved would be desirable.

One particularly advantageous way of achieving this objective is the use of particles having protected isocyanate functions on their surface. Where such particles are incorporated into 1K polyurethane coating materials, the isocyanate functions on the particle surfaces are liberated as well in the course of coating-material curing, and the particles are incorporated chemically into the finish. Moreover, the protected isocyanate functions, which are generally identical with the protected isocyanate functions of the coating-material curative, improve compatibility between particle and coating-material matrix.

Particles of this kind containing protected isocyanate functions are in principle already known. They are typically prepared by condensing a particle having free silicon hydroxide or metal hydroxide functions with an alkoxysilyl-functional organosilicon compound whose organic radical contains a protected isocyanate function. Organosilicon compounds of this kind containing masked isocyanate groups have already been described, in DE 34 24 534 A1, EP 0 212 058 B1, EP 872 500 A, JP 08-291186 or JP 10-067787, for example. A feature common to all of these compounds, however, is that between the masked isocyanate group and the silyl group there is a propylene group, as a result of which the hydrolytic reactivity and condensation reactivity of these silane compounds is low. Accordingly these compounds also possess low reactivity toward the silicon hydroxide or metal hydroxide functions of the particle, and so do not react at all or else react very slowly, or so that some of the NCO-protective groups start to cleave even under conditions suitable for the functionalization, elevated temperatures for example, as a result of which the particles can no longer be used in 1K polyurethane coating materials. This is true in particular of monoalkoxysilyl-functional silanes with protected isocyanate functions, whose reactivity is so low that they are usually completely unsuitable for the functionalization of particles. In certain cases, however, the use specifically of monofunctional alkoxysilanes would be particularly desirable, since using these silanes it would be possible with extreme ease to furnish the corresponding particles with protected isocyanate functions (readily accessible from a steric standpoint). Thus, monofunctional alkoxysilanes would possess the advantage that—subject to the proviso of a relatively high reactivity—they would react fully even without addition of water and in so doing would also not crosslink with one another to form a—usually relatively soft—shell around the particle.

SUMMARY OF THE INVENTION

It is an object of the present invention, therefore, to provide particles having masked isocyanate functionalities which may be prepared without problems from precursors having significantly higher reactivity. These and other objects are achieved through modification of particle surfaces with silyl compounds having oxygen, sulfur, or nitrogen α to the silyl group.

DETAILED DESCRIPTION OF THE PREFERRED EMBODIMENTS

The invention provides particles (P) possessing a core composed of atoms selected from metal atoms, silicon atoms, and oxygen atoms, or of silicone resins, and possessing at least one protected isocyanate group on their surface, the particles (P) being obtainable by reaction of particles (P1) which are composed of atoms selected from metal atoms, silicon atoms, and oxygen atoms, or of silicone resins and possessing free hydroxide functions, with
a) organosilanes (A) which contain at least one protected isocyanate function, or
b) with organosilanes (A1) which possess at least one NH, OH or SH function, to give, as an intermediate, NH-, OH- or SH-functional particles (P2), which in a further reaction step are reacted with a compound (A2) which possesses not only at least one protected isocyanate function but also an unprotected isocyanate function, to give the particles (P), the organosilanes (A) and (A1), prior to their reaction with the particles (P1), either possessing an oxygen atom, sulfur atom or nitrogen atom in a position to the silyl unit or possessing an Si—O or Si—N unit, which are part of a cyclic structural element.

The invention also provides a process for preparing the particles (P).

In one preferred embodiment of the invention the organosilanes (A) or (A1) possess a reactive silyl function of the general formula (I)

$$(R^1O)_{3-n}(R^2)_n Si\text{—}CH_2\text{-A-} \quad (I)$$

where
$R^1$ is hydrogen, alkyl, cycloalkyl or aryl radical having in each case 1 to 6 C atoms, it being possible for the carbon chain to be interrupted by nonadjacent oxygen, sulfur or $NR^3$ groups,
$R^2$ is alkyl, cycloalkyl, aryl or arylalkyl radical having in each case 1 to 12 C atoms, it being possible for the carbon chain to be interrupted by nonadjacent oxygen, sulfur or $NR^3$ groups,
$R^3$ is hydrogen, alkyl, cycloalkyl, aryl, arylalkyl, aminoalkyl or aspartate ester radical, A is oxygen, sulfur, a group of the formula $NR^3$ or a nitrogen atom which is part of a heterocyclic ring, and
n may take on the values 0, 1 or 2.

In a further preferred embodiment of the invention organosilanes (A1) are used which possess a reactive silyl function of the general formula (II) or (IIa)

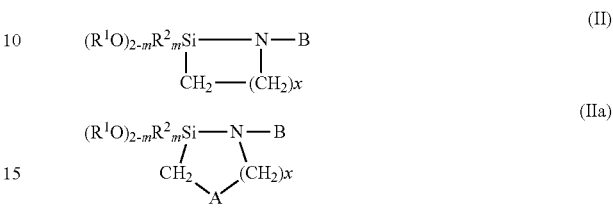

where
B is hydrogen or any carbon-containing radical,
m may take on the values 0, 1 or 2, and
x may take on the values between 0 and 10,
and A, $R^1$, $R^2$ and $R^3$ have the definitions specified in the context of the general formula (I).

In a further preferred embodiment of the invention compounds of the general formula (III) or (IIIa)

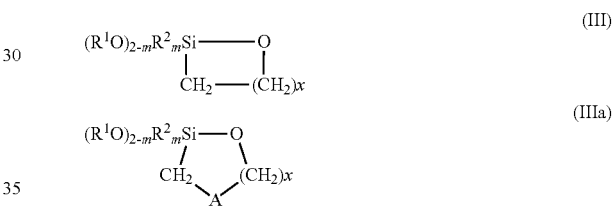

where m, x, A, $R^1$, $R^2$, $R^3$ have the definitions specified in the context of the general formulae (I) and (II) are used as organosilanes (A1).

The group $R^1$ in the general formulae (I), (II), (IIa), (III), and (IIIa) preferably comprises methyl or ethyl radicals. The group $R^2$ preferably comprises methyl, ethyl, isopropyl or phenyl radicals. The preferred value for m is 2, while for x values from 1 to 4 are preferred and the value of 2 is particularly preferred. $R^3$ preferably has not more than 10 carbon atoms, in particular not more than 4 carbon atoms. B preferably has not more than 18 carbon atoms. B is preferably an alkyl, cycloalkyl, alkenyl, aryl, arylalkyl, silylalkyl or silyl group which is either unsubstituted or else substituted by halogen atoms, hydroxyl functions and/or amine functions. The main chain of B may be interrupted by oxygen, sulfur or $NR^3$ groups.

The invention is based on the surprising fact that the silanes (A) and (A1) exhibit an extremely high reactivity toward the free hydroxide functions of the particles (P1). The free hydroxide functions are metal hydroxide or silicon hydroxide functions.

Hence the silanes (A) and (A1) are more reactive by a multiple than conventional organosilanes in which the alkoxysilyl groups are separated by a propyl spacer from the organic functionality. This applies not only to the silanes with alkoxysilyl groups of the general formula (I) which have a heteroatom in a position to the silyl unit but also to the cyclic silanes of the general formulae (II), (IIa), (III), and (IIIa). Because of this high reactivity the organosilanes (A) and (A1) react significantly more quickly with the particles (P1), and the reaction proceeds without problems and to completion. This reaction often is only made possible by the high reactivity of the silanes. Even monofunctional silanes, i.e., silanes having silyl groups of the general formula (I), (II), (IIa), (III) or (IIIa) with n=2 or m=2 are sufficiently reactive toward the particles (P1) and are therefore suitable for preparing particles (P) of the invention having protected isocyanate functions. If monofunctional silanes are used, it is possible to do entirely without the addition of water for the hydrolysis of the alkoxysilyl groups.

The reaction between the particles (P1) and the organosilanes (A) or (A1) takes place immediately following the reactants being mixed together. The particles (P1) may in this case be present either as a dispersion in an aqueous or an anhydrous solvent, or in the solid state. In the latter case, mixing may take place, for example, in a fluidized-bed reactor or other known mixing apparatus, such as plowshare mixers and the like, for example.

In the preparation of the particles (P) from particles (P1) it is possible to carry out the surface modification using not only the silanes (A) and (A1) but also, in addition, other silanes (S1), silazanes (S2) or siloxanes (S3). The silanes (S1) possess either hydroxysilyl groups or else hydrolyzable silyl functions, the latter being preferred. These silanes may additionally possess further organic functions, although silanes (S1) without further organic functions can also be used. The silanes (A) and/or (A1) may be used as a mixture with the silanes (S1), silazanes (S2) or siloxanes (S3). In addition, the particles may also be functionalized successively with the different types of silane.

Particular preference is given here to using mixtures of silanes (A) and/or (A1) with silanes (S1) of the general formula (IV)

$$(R^1O)_{4-a-b-c}(R^2)_a(Z)_cSi(R^4)_b \qquad (IV)$$

where
$R^1$, $R^2$ and $R^3$ have the definitions specified in the context of the general formula (I), and
$R^4$ radicals are SiC-bonded hydrocarbon radicals having 1 to 18 carbon atoms, substituted if desired by halogen atoms, amino groups, ether groups, ester groups, epoxy groups, mercapto groups, cyano groups, isocyanate groups, phosphonate groups, methacryloyl groups or (poly)glycol radicals, the latter being composed of oxyethylene and/or oxypropylene units,
Z is a halogen atom, pseudohalogen radical, Si—N-bonded amine radical, amide radical, oxime radical, amineoxy radical, or acyloxy radical,
a is 0, 1, 2 or 3,
b is 0, 1, 2 or 3,
c is 0, 1, 2 or 3, and
a+b+c is 0, 1, 2, 3 or 4.

Here a is preferably 0, 1 or 2, while b and c are preferably 0 or 1.

Silazanes (S2) and siloxanes (S3) used are with particular preference hexamethyldisilazane and hexa-methyldisiloxane or linear siloxanes having chain ends with or without an organic function.

Particles (P1) which can be used are all metal oxide particles and mixed metal oxide particles (e.g., aluminum oxides such as corundum, mixed aluminum oxides with other metals and/or silicon, titanium oxides, zirconium oxides, iron oxides, etc.), silicon oxide particles (e.g., fumed silica, precipitated silica, colloidal silica) or silicon oxide compounds in which some of the valences of the silicon carry organic radicals, i.e., silicone resins. These particles (P1) are notable for the fact that on their surface they possess metal hydroxide and/or silicon hydroxide functions via which a reaction with the organosilanes (A) or (A1) can take place. The particles (P1) preferably possess an average diameter of 1 nm to 100 μm, more preferably of 10 nm to 200 nm.

In one preferred embodiment of the invention the particles (P1) are composed of fumed silica, prepared in a pyrogenic reaction from silicon compounds, such as from silicon tetrachloride or methyldichlorosilane, or hydrogentrichlorosilane or hydrogenmethyldichloro-silane, or other methylchlorosilanes or alkylchloro-silanes, both as they are and in the mixture with hydrocarbons, or any desired volatilizable or sprayable mixtures of organosilicon compounds. The silica here may be prepared optionally with and without addition of water, in the purification step for example; preferably no water is added.

The fumed silica preferably has a density of surface silanol groups (SiOH) amenable to chemical reactions that is less than 2.5 SiOH/nm², preferably less than 2.1 SiOH/nm², more preferably less than 2 SiOH/nm², and with particular preference from 1.7 to 1.9 SiOH/nm².

It is possible to use silicas prepared by a wet-chemical route or prepared at high temperature (greater than 1000° C.). Particular preference is given to pyrogenically prepared silicas. It is possible to use hydrophilic silicas which come freshly prepared direct from the burner, which have been stored or which have already been packaged in commercially customary form. It is possible as well to use hydrophobicized silicas, examples being commercially customary hydrophobicized silicas.

It is possible to use uncompacted silicas with bulk densities of preferably less than 60 g/l, or else compacted silicas having bulk densities of preferably greater than 60 g/l.

It is also possible to use mixtures of different metal oxides or silicas, such as mixtures of metal oxides or silicas with different BET surface areas, for example, or mixtures of metal oxides with different degrees of hydrophobicization or of silylation, for example.

The silica can be prepared in continuous or discontinuous processes, and the process for silylation may be composed of one or more steps. The silylated silica is preferably prepared by means of a process in which the operation of preparation takes place in separate steps: (A) first, preparation of the hydrophilic silica, and then (B) the silylation of the silica by
a) loading the hydrophilic silica with silane (A) or (A1),
b) reacting the hydrophilic silica with the silane (A) or (A1), and
c) purifying the silica to remove excess silane (A) or (A1).

The surface treatment is preferably carried out in an atmosphere that does not lead to oxidation of the silylated silica, i.e., preferably less than 10% by volume oxygen, more preferably less than 2.5% by volume, the best results being achieved at less than 1% by volume oxygen.

Coating, reaction, and purification can be carried out as a discontinuous or continuous operation. For technical reasons a continuous reaction regime is preferred.

Coating takes place preferably at temperatures of (−30)–250° C., preferably 20-150° C., with particular preference 20-80° C.; in the course of the coating step, cooling is preferably carried out to 30-50° C. The residence time is 1 min-24 h, preferably 15-240 min, and for space-time yield reasons with particular preference 15-90 min. The pressure during coating ranges preferably from a slight underpressure of 0.2 bar up to an overpressure of 100 bar, with preference being given for technical reasons to standard pressure—that is, unpressurized operation in relation to external/atmospheric pressure.

The silane (A) or (A1) is preferably added as a liquid and in particular is mixed into the silica in powder form. This is accomplished preferably by nozzle techniques, or comparable techniques, such as effective atomization techniques, such as atomizing in one-fluid nozzles under pressure (preferably at 5-20 bar), spraying in two-fluid nozzles under pressure (preferably gas and liquid 2-20 bar), very fine division with atomizers or gas/solid exchange assemblies with moving, rotating or static internals which allow homogeneous distribution of the silane with the powder-formed silica.

Preferably the silane (A) or (A1) is added in the form of a very finely divided aerosol, characterized in that the aerosol has a settling velocity of 0.1-20 cm/s and a drop size with an aerodynamic particle radius of 5-25 µm.

The loading of the silica and the reaction with the silane A or A1 take place preferably with mechanical or gasborne fluidization. Mechanical fluidization is particularly preferred.

Gasborne fluidization can be by means of all inert gases which do not react with the silane (A) or (A1), with the silica, and with the silylated silica—that is, which do not lead to side reactions, degradation reactions, oxidation events or flame or explosion phenomena—such as, preferably, $N_2$, Ar, other noble gases, $CO_2$, etc. The fluidizing gases are supplied preferably in the region of superficial gas velocities of 0.05-5 cm/s, with particular preference of 0.5-2.5 cm/s.

Particular preference is given to mechanical fluidization, which takes place, without additional employment of gas beyond that used for inertization, by means of paddle stirrers, anchor stirrers, and other suitable stirring elements.

In one particularly preferred embodiment, unreacted silane (A) or (A1) and exhaust gases from the purification step are recycled to the step of coating and loading the silica; this recycling may be partial or complete, accounting preferably for 10-90% of the overall volume flow of the gases emerging from the purification stage.

This is done in suitably thermostatted apparatus. This recycling takes place preferably in noncondensed phase, i.e., in the form of gas or in the form of vapor. This recycling may take place as mass transport along a pressure equalization, or as controlled mass transport with the standard industry gas-transport systems, such as fans, pumps, compressed-air membrane pumps. Since it is preferred to recycle the non-condensed phase, it may be advisable to heat the recycle lines.

The recycling of the unreacted silane (A) or (A1) and of the exhaust gases may lie in this case between 5% and 100% by weight, based on their total mass, preferably between 30% and 80% by weight. The recycling may amount here, based on 100 parts of freshly used silane, to between 1 and 200 parts, preferably 10 to 30 parts.

The recycling of the purification products from the silylation reaction to the coating operation is preferably continuous.

The reaction takes place preferably at temperatures of 40-200° C., preferably at temperatures of 40-160° C. and with particular preference at 80-120° C.

The reaction time is 5 min to 48 h, preferably 10 min to 5 h.

Optionally it is possible to add protic solvents, such as liquid or vaporizable alcohols or water; typical alcohols are isopropanol, ethanol, and methanol. It is also possible to add mixtures of the abovementioned protic solvents. It is preferred to add 1-50% by weight of protic solvent relative to the silica, with particular preference 5-25% by weight. Water is particularly preferred.

Optionally it is possible to add acidic catalysts (Lewis or Brönsted acids), e.g., hydrogen chloride, or basic catalysts (Lewis or Brönsted bases), e.g., ammonia. They are preferably added in traces, which means less than 1000 ppm. With particular preference no catalysts are added.

Purification takes place at a temperature of 20-200° C., preferably at 50-150° C., more preferably at 50-100° C. The purification step is preferably characterized by agitation, with particular preference being given to slow agitation and a low level of mixing together. The stirring elements are advantageously set and moved in such a way that, preferably, mixing and fluidization, but not complete vortexing, occur.

The purification step may additionally be characterized by an increased gas input, corresponding to a superficial gas velocity of preferably 0.001-10 cm/s, more preferably 0.01-1 cm/s. This can be done by means of all inert gases which do not react with the silane (A) or (A1), with the silica, or with the silylated silica, i.e., do not lead to side reactions, degradation reactions, oxidation events, or flame and explosion phenomena—such as, preferably, $N_2$, Ar, other noble gases, $CO_2$, etc.

In addition it is possible during the silylation step or following the purification step preferably to employ methods for the mechanical compaction of the silica, such as, for example, press rollers, milling assemblies, such as edge runner mills and such as ball mills, continuously or batchwise, compaction by screws or worm mixers, worm compactors, briquetting machines, or compaction by suction withdrawal of the air or gas present, by means of suitable vacuum methods.

Particular preference is given to mechanical compaction during the silylating step by means of press rollers, abovementioned milling assemblies such as ball mills, or compaction by means of screws, worm mixers, worm compactors, briquetting machines.

In a further particularly preferred procedure, purification is followed by the use of methods for the mechanical compaction of the silica, such as compaction by suction withdrawal of the air or gas present, by means of suitable vacuum methods, or press rollers, or a combination of both methods.

Additionally it is possible, in one particularly preferred procedure, following purification, to use methods for deagglomerating the silica, such as pinned-disk mills or milling/classifying devices, such as pinned-disk mills, hammer mills, opposed-jet mills, impact mills or milling/classifying devices.

The silanes (A) or (A1) are used preferably in an amount of more than 0.5% by weight (based on the silica), preferably greater than 3% by weight (based on the silica), with particular preference greater than 5% by weight (based on the silica).

For the surface modification it is possible to use the silanes (A) or (A1) alone or in any mixtures with other silanes (A) or (A1). Particular preference is given to a version of the invention in which the particles (P) of fumed silica, silanes (A) or (A1), and further silanes (S1), preferably of the formula (IV), silazanes (S2) and/or siloxanes (S3) are employed. The various silanes are in this case used preferably as a mixture.

The silylated fumed silica is characterized in particular in that it has an average primary-particle particle size of less than 100 nm, preferably an average primary-particle particle size of 5 to 50 nm, these primary particles usually not existing in isolation in the silica but instead being parts of larger aggregates (as defined in DIN 53206), which have a diameter of 100 to 1000 nm.

Furthermore, the silylated fumed silicas are characterized in particular in that the silica has a specific surface area of 10 to 400 $m^2/g$ (measured by the BET method in accordance with DIN 66131 and 66132), the silica having a fractal mass dimension $D_m$ of less than or equal to 2.8, preferably less than or equal to 2.7, more preferably of 2.4 to 2.6, and a surface silanol group SiOH density of less than 1.5 SiOH/nm², preferably of less than 0.5 SiOH/nm², more preferably of less than 0.25 SiOH/nm².

In one further preferred version of the invention the particles (P1) used are colloidal silicon oxides or metal oxides, which are generally present in the form of a dispersion of the corresponding oxide particles of submicron size in an aqueous or other solvent. In this context it is possible to make use, among others, of the oxides of the metals aluminum, titanium, zirconium, tantalum, tungsten, hafnium, tin. Particular preference is given to using organic solutions of colloidal silica sols.

The preparation of the particles (P) of the invention from colloidal silicon oxides or metal oxides may take place by a variety of processes. Preferably, though, it takes place by addition of the silanes (A)—where appropriate in combination with other silanes (S1), silazanes (S2) or siloxanes (S3)—to the aqueous or organic sol. This sol is, where appropriate, stabilized ionically, i.e., acidically, e.g., by hydrochloric acid, or basically, e.g., by ammonia, or sterically, e.g., by alcohols. The reaction takes place in general at temperatures of 0-200° C., preferably at 20-80° C., and more preferably at 20-60° C. The reaction times are typically between 5 min and 48 h, preferably between 1 and 24 h. Optionally it is also possible to add acidic, basic or heavy-metal-containing catalysts as well. These are used preferably in traces <1000 ppm. With particular preference no addition of separate catalysts is made, however.

Likewise preferred, furthermore, are particles (P1) composed of silicone resins of the general formula (V)

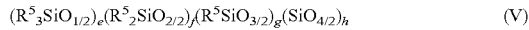  (V)

where
R⁵ is an OR¹ function, an OH function, an optionally halogen-, hydroxyl-, amino-, epoxy-, phosphonate-, thiol-, (meth)acryloyl-, or else NCO-substituted hydrocarbon radical having 1-18 carbon atoms,
e is a value greater than or equal to 0,
f is a value greater than or equal to 0,
g is a value greater than or equal to 0,
h is a value greater than or equal to 0, and the sum of e+f+g+h is at least a value which is at least 1, preferably at least 5.
Preferably at least 70 mol % of all radicals R⁵ are methyl, ethyl, isopropyl or phenyl radicals.

In one preferred embodiment, in the silicone resins of the general formula (V), the sum of e+h has at least 90 mol % of the sum of e+f+g+h.

The preparation of the particles (P) of the invention from silicone resins of the formula (V) and silanes (A) can take place by way of the processes described above.

In one preferred embodiment of the invention the particles (P) are prepared by reacting OH-functional particles (P1) with organosilanes (A) of the general formula (VI)

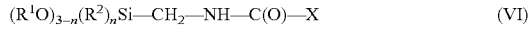  (VI)

where
R¹ and R² have the definitions specified in the context of the general formulae (I), and
X is a protective group which is eliminated at temperatures between 80 and 300° C. in the form of HX, and in being eliminated liberates an isocyanate function.

As protective groups HX it is possible to use secondary or tertiary alcohols, such as isopropanol or tert-butanol, CH-acidic compounds such as diethyl malonate, acetylacetone, ethyl acetoacetate, oximes such as formaldoxime, acetaldoxime, methyl ethyl ketoxime, cyclohexanone oxime, acetophenone oxime, benzophenone oxime or diethyleneglyoxime, lactams, such as caprolactam, valerolactam, butyrolactam, phenols such as phenol, o-methylphenol, N-alkylamides such as N-methylacetamide, imides such as phthalimide, secondary amines such as diisopropylamine, imidazole, 2-isopropylimidazole, pyrazole, 3,5-dimethylpyrazole, 1,2,4-triazole, and 2,5-dimethyl-1,2,4-triazole. It is preferred here to use protective groups such as butanone oxime, 3,5-dimethylpyrazole, caprolactam, diethyl malonate, dimethyl malonate, ethyl aceto-acetate, diisopropylamine, pyrrolidone, 1,2,4-triazole, imidazole, and 2-isopropylimidazole. Particular preference is given to using protective groups which allow a low baking temperature, such as diethyl malonate, dimethyl malonate, butanone oxime, diisopropylamine, 3,5-dimethylpyrazole, and 2-iso-propylimidazole, for example.

In a further preferred embodiment of the invention the particles (P) are prepared by reacting OH-functional particles (P1) with organosilanes (A) of the general formula (VII)

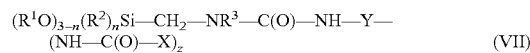  (VII)

where
R¹, R², R³, and X have the definitions specified in the context of the formulae (I) to (VI),
Y is a (z+1)-functional aliphatic or aromatic radical, and
z is a number from 1-4, preferably 1 or 2.

Silanes (A) of the general formula (VII) are preferably prepared by a reaction of di- or polyisocyanates of the general formula (VIII)

  (VIII)

with aminosilanes (A1) which possess structural elements of the formula (I), and protective groups HX.

With particular preference, silanes (A) of the general formula (VII) are prepared by reacting di- or polyisocyanates of the general formula (VIII) with aminosilanes (A1) of the general formula (IX)

  (IX)

where all of the other variables have the definitions specified in the context of the general formula (I).

The sequence of the reaction steps in this case is arbitrary; in other words, the di- or polyisocyanate can be reacted in a first reaction step either with the protective group HX or with the silane (A1), the proportions being chosen such that in each case only some of the isocyanate groups are consumed by reaction. In a second reaction step the remaining isocyanate groups are then reacted with the reactant that is still missing in each case. The mixture obtained, containing the silane of the general formula (VII), is preferably isocyanate-free. It is of course also possible for the di- or polyisocyanate to be reacted directly with a mixture of the protective group HX and the silane (A1). Any desired solvents or solvent mixtures can be used, with preferably all of the reaction components being soluble in said solvent (mixture).

As di- or polyisocyanates of the general formula (VIII) it is possible in principle to use all customary isocyanates, as are widely described in the literature. Common diisocyanates are, for example, diisocyanato-diphenylmethane (MDI), both in the form of crude or technical MDI and in the form of pure 4,4' or 2,4' isomers, or mixtures thereof, tolylene diisocyanate (TDI) in the form of its different regioisomers, diisocyanatonaphthalene (NDI), isophorone diisocyanate (IPDI), perhydrogenated MDI (H-MDI), tetramethylene diisocyanate, 2-methylpentamethylene diisocyanate, 2,2,4-trimethylhexamethylene diisocyanate, dodeca-methylene diisocyanate, 1,4-diisocyanatocyclohexane, 1,3-diisocyanato-4-methylcyclohexane or else hexamethylene diisocyanate (HDI). Examples of polyisocyanates are polymeric MDI (P-MDI), triphenyl-methane triisocyanate, and also all isocyanurate or biuret trimers of the above-recited diisocyanates. All di- and/or polyisocyanates can be used individually or else in mixtures. If a particular UV stability of the products is desired, it is preferred to use aliphatic isocyanates or their trimers or oligomers, more preferably IPDI and HDI and their trimers.

In one particularly preferred version of this process the di- or polyisocyanate is first reacted with a substoichiometric amount of a protective group HX, giving a mixture in which between 50% and 99% of all the isocyanate groups are in protected form. Subsequently all of the unprotected isocyanate groups are reacted with the aminosilane (A1) of the general formula (IX). In this case it is also possible if desired for there to be a solvent present. A mixture is obtained which as well as silanes (A) of the general formula (VII) also has fully protected isocyanates of the general formula (X)

$$Y-(NH-C(O)-X)_{z+1} \quad (X)$$

and also, where appropriate, silanes of the general formula (XI)

$$[(R^1O)_{3-n}(R^2)_nSi-CH_2-NR^3-C(O)-NH]_y-Y-(NH-C(O)-X)_{z+1-y} \quad (XI)$$

where y can take on a value of 2 to z+1 and all other variables have the definitions specified above. The stoichiometric ratios and also the reaction regime are preferably chosen so that the amount of silanes of the general formula (XI) present is as low as possible.

This mixture containing silanes of the general formula (VII) can be reacted directly with the particles (P1) which possess free metal hydroxide or silicon hydroxide functions, the silanes of the general formula (VII) reacting with the particles (P1) to give the particles (P). The alcohol $R^1OH$ which is released in this reaction may where appropriate be separated off by distillation. This mixture, comprising the particles (P) and also fully protected di- or polyisocyanates of the general formula (X), can—both in solvent-containing and in solvent-free form—be used, without further work-up, as the sole curative or as part of the curing component in a coating material. Where the coating material additionally includes further curatives, they are preferably isocyanate or melamine curatives, more preferably protected isocyanate curatives. With preference the mixtures described are used as the curative or as part of the curing component in 1K PU coating materials.

In a further preferred embodiment of the invention the particles (P) are prepared by reacting OH-functional particles (P1) with organosilanes (A1) of the general formula (II), (IIa), (III), (IIIa) or (IX), giving aminoalkyl- and/or hydroxyalkyl-functional particles (P2) as an intermediate. These particles (P2) are then reacted in a $2^{nd}$ reaction step with a part-protected isocyanate (A2) of the general formula (XII)

$$OCN-Y-(NH-C(O)-X)_z \quad (XII)$$

to give the particles (P), the variables Y, X, and z possessing the definitions specified in the context of the general formula (VII).

The proportions between the aminoalkyl- and/or hydroxyalkyl-functional particles (P2) and the part-protected isocyanates (A2) are preferably chosen such that the resulting mixture comprising the particles (P) is free from unprotected isocyanate groups.

The alcohol that may be released in the first reaction step is removed preferably by distillative means, where appropriate under reduced pressure. In one preferred process the entire synthesis of the particles (P) starting from the particles (P1), via the particles (P2) formed as an intermediate, is carried out as a one-pot synthesis.

The part-protected isocyanates (A2) of the general formula (XII) are prepared by the reaction of a di- or polyisocyanate of the general formula (VIII) with protective groups HX.

In one particularly preferred version of this process the part-protected isocyanate of the general formula (XII) is prepared by simple mixing of a di- or polyisocyanate of the general formula (VIII) with a protective group HX, the protective group HX being used in a substoichiometric amount, thus giving a mixture in which between 50% and 99% of all the isocyanate groups are in protected form. This mixture, as well as the part-protected isocyanate (A2) of the general formula (XII), also contains fully protected isocyanates of the general formula (X) and also, where appropriate, isocyanates of the general formula (XIII)

$$(OCN)_y-Y-(NH-C(O)-X)_{z+1-y} \quad (XIII)$$

where all of the variables have the definitions specified above. In this case the stoichiometric proportions and also the reaction regime are preferably chosen so that the amount of isocyanates of the general formula (XIII) present is as low as possible.

This mixture containing part-protected isocyanates (A2) of the formula (XII) can be reacted directly with the aminoalkyl- or hydroxyalkyl-functional particles (P2), the part-protected isocyanates (A2) reacting with the particles (P2) to give the particles (P). This mixture, containing the particles (P) and also fully protected di- or polyisocyanates of the general formula (X), can —both in solvent-containing and in solvent-free form—be used without further work-up as a curing component or as part of the curing component in a coating material.

In one particularly preferred embodiment of the invention the particles (P) are prepared by reacting OH-functional particles (P1) with organosilanes (A1) of the formula (XIV),

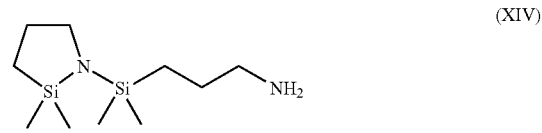

and the amino-functional particles (P2) obtained as an intermediate in that reaction are reacted in a $2^{nd}$ reaction step with a part-protected isocyanate (A2) of the general formula (XII) to give the end product (P).

The reaction which takes place here in the first reaction step, between the particles (P1) with hydroxide groups and the silane of the general formula (XIV), is shown in the scheme below (in this scheme the Si/Me-OH groups represent the corresponding functions on the surface of the particles (P1)):

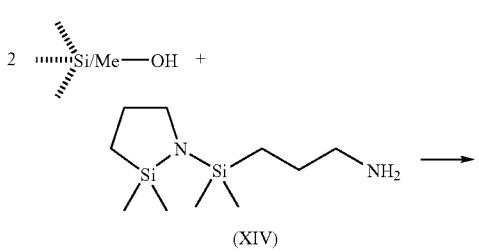

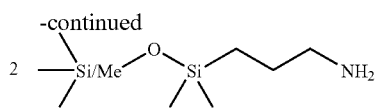

The silane of the general formula (XIV) here possesses the same extremely high reactivity toward the silicon hydroxide or metal hydroxide functions as silanes containing highly reactive silyl functions of the general formula (I).

The silane of the general formula (XIV), however, possesses the additional advantage that no alcohol is released on its reaction with the particles (P1).

In the second reaction step, the proportions between the amino-functional particles (P2) and the part-protected isocyanates (A2) are preferably chosen such that the resulting mixture comprising the particles (P) is free from unprotected isocyanate groups.

The part-protected isocyanates (A2) of the general formula (XII) are prepared, as has already been described, by the reaction of a di- or polyisocyanate of the general formula (VIII) with protective groups HX.

Here as well, the mixture obtained from the reaction of the part-protected isocyanates (A2) with the amino-functional particles (P2) can be used—both in solvent-containing and in solvent-free form—without further work-up as a curing component or else as part of the curing component in a coating material.

The invention further provides coating formulations (B) which comprise the particles (P) containing blocked isocyanate groups. The coatings involved are preferably scratch-resistant coatings.

In this context the particles (P), for the purpose of preparing a curing component for polyurethane coatings, can be mixed with any further protected isocyanate curatives, unprotected isocyanate curatives or melamine curatives, with preference being given, however, to protected isocyanate curatives. Where appropriate, however, the particles (P) may also function as the sole curing component. The particles (P) are used preferably as curatives or as part of the curing component in 1K PU coating materials. As described, the particles (P) are obtained in their preparation, directly where appropriate, as a mixture with further protected isocyanates. These mixtures as well can be used either as sole curing components or else only as part of a curing component in coating materials.

To produce a polyurethane coating material, the curing component is combined with any desired substances which have a functionality of at least two and are reactive toward isocyanate groups. Such substances are preferably hydroxyl-containing prepolymers, more preferably hydroxyl-containing polyacrylates or polyesters. The ratio of blocked isocyanate groups to isocyanate-reactive groups is chosen typically from 0.5 to 1.5, preferably 0.8 to 1.2.

The coating formulations (B) preferably contain 0-90% by weight, based on the solids fraction, of a coating-material curative possessing protected or unprotected NCO functions, preferably 20-90% by weight, based on the solids fraction, of a hydroxyl-functional film-forming resin, and preferably 3-40% by weight, based on the solids fraction, of particles (P).

Furthermore, the coating formulations (B) may also comprise the common solvents and also the adjuvants and additives that are typical in coating formulations. Mention might be made here, among others, of flow control assistants, surface-active substances, adhesion promoters, light stabilizers such as UV absorbers and/or free-radical scavengers, thixotropic agents, and other solids. Adjuvants of this kind are generally unavoidable for generating the particular desired profiles of properties both of the coating formulations (B) and of the cured coatings. Additionally, the coating formulations (B) may also comprise pigments.

The coating formulations (B) obtained may be used for coating any desired substrates in the aim of improving the scratch resistance, abrasion resistance or chemical resistance. Preferred substrates are plastics such as polycarbonate, polybutylene terephthalate, polymethyl methacrylate, polystyrene or polyvinyl chloride, and also other coatings applied in a previous step. The coating materials may also be used as scratch-resistant clearcoats or topcoats, in the vehicle industry, for example. The coating material may be applied by any methods, such as immersion, spraying and casting methods. Application by a wet-on-wet method is also possible. Curing is accomplished by heating under the conditions necessary for blocked isocyanates, and can of course be accelerated by the addition of catalysts.

All symbols in the above formulae have their definitions in each case independently of one another. In all formulae the silicon atom is tetravalent.

Unless indicated otherwise, all quantity and percent data are based on the weight, all pressures are 0.10 MPa (abs.), and all temperatures are 20° C.

EXAMPLES

Example 1

Preparation of Part-Protected Isocyanates 50 g of Desmodur® VP LS 2294 (HDI trimer from Bayer with an isocyanate content of 5.46 mmol NCO/g) are introduced and 70 ml of butyl acetate are added. With very thorough stirring, 17.85 g of butane oxime are added over the course of 10 min at a temperature of −12° C. In the course of this addition the temperature rises to a maximum of 0° C. After the end of the addition the cooling is removed. As a result of the exothermic reaction, the reaction mixture warms up within the next 20 min to 30-40° C. It is subsequently stirred for 2 hours. $^{1}$H NMR spectroscopy demonstrates that the butane oxime has undergone full reaction. That is, in accordance with the stoichiometric amounts employed, 75% of the isocyanate functions present in the HDI trimer have been protected with butane oxime. The remaining isocyanate units remain unprotected.

Example 2

Preparation of Amino-Functional MQ Resins

A solution of 25.00 g of an MQ resin (resin of composition $(Me_3SiO_{1/2})_{0.4}(SiO_{4/2})_{0.6}(O_{1/2}C_2H_5)_{0.2}$, with an average molecular weight Mw of 1400 g/mol and an OH group content of 3.4% by weight) in 25 ml of dry toluene is admixed dropwise with a solution of 5.76 g of the compound XIV in 5 ml of dry toluene and the mixture is stirred at room temperature for 6 hours. $^{1}$H and $^{29}$Si NMR spectroscopy shows that all of the OH groups of the MQ resin have been functionalized with aminopropyldimethylsilyl groups and that compound XIV is no longer detectable, i.e., has undergone complete reaction.

Example 3

Preparation of MQ Resins with Protected Isocyanate Groups and of a Coating Formulation Comprising these MQ Resins 2.25 g of the amino-functional MQ resin solution from example 2 are admixed with 2.25 g of dry toluene. This gives a clear solution. This solution is admixed, with thorough stirring, with 3.45 g of the solution of part-protected isocyanates in butyl acetate that was produced in example 1. The mixture heats up slightly. Then 5 g of a paint polyol (EGT 25-34/4 from Bayer, polyol with an OH group content of 1.0 mmol OH/g) are incorporated. Stirring is carried out for several minutes until a homogeneous and clear solution has formed.

Example 4

Preparation of MQ Resins with Protected Isocyanate Groups and of a Coating Formulation Comprising these MQ Resins 3.0 g of the amino-functional MQ resin from example 2 are admixed with 3.0 g of toluene. This gives a clear solution. This solution is admixed, with thorough stirring, with 3.75 g of the solution of part-protected isocyanate that was produced in example 1. The mixture heats up slightly. Then 5 g of a paint polyol (EGT 25-34/4 from Bayer, polyol with an OH group content of 1.0 mmol OH/g) are incorporated. Stirring is carried out for several minutes until a homogeneous and clear solution has formed.

Comparative Examples 1 and 2

The procedure of example 3 is repeated, but without the use of the amino-functional MQ resins from example 2. In comparative example 1 the amounts of the other coating-material components employed remain unchanged relative to example 3.

In comparative example 2, in contrast, only 2.6 g of the solution of part-protected isocyanates in butyl acetate from example 1 are added to 5.0 g of the paint polyol (EGT 25-34/4 from Bayer).

Example 5

Production and Evaluation of Coating Films

The coating materials from examples 3 and 4 and from comparative examples 1 and 2 are each knife-coated using a Coatmaster® 509 MC film-drawing device from Erichsen, with a knife with a slot height of 120 μm, to a glass plate. The coating films obtained are then dried in a forced-air drying cabinet at 140° C. for 60 minutes. Both from the coating formulations of examples 3 and 4 and from those of comparative examples 1 and 2, coatings are obtained which are visually attractive and smooth. The gloss of all four coatings, determined using a Micro gloss 20° gloss meter from Byk, was approximately 155 gloss units for all four coating materials.

The scratch resistance of the cured coating films thus produced is determined using a Peter-Dahn abrasion-testing instrument. For this purpose a Scotch Brite® 2297 nonwoven with an area of 45×45 mm is loaded with a weight of 500 g and used for scratching with 40 strokes. Both before the beginning and after the end of the scratch tests, the gloss of the respective coating is measured using a Micro gloss 20° gloss meter from Byk. As a measure of the scratch resistance of the respective coating, the loss of gloss was ascertained:

TABLE 1

Loss of gloss in the Peter-Dahn scratch test:

| Coating sample | Loss of gloss |
|---|---|
| Example 3 | 52.1% |
| Example 4 | 59.5% |
| Comparative example 1 | 68.3% |
| Comparative example 2 | 69.9% |

Example 6

Preparation of Protected Isocyanates 50 g of Desmodur® VP LS 3300 (HDI trimer from Bayer with an isocyanate content of 5.18 mmol NCO/g) are introduced and 80 ml of butyl acetate are added. With very thorough stirring, 17.85 g of butane oxime are added over the course of 10 min at a temperature of −12° C. In the course of this addition the temperature rises to a maximum of 0° C. After the end of the addition the cooling is removed. As a result of the exothermic reaction, the reaction mixture warms up within the next 20 min to 30-40° C. It is subsequently stirred for 2 hours. This gives a solution having a solids content of 55.3% by weight and a protected NCO group content of 1.97 mmol/g, in which a free NCO band is no longer detectable by IR spectroscopy.

Example 7

Preparation of Alkoxysilanes with Protected Isocyanate Groups 86.10 g of 2-butanone oxime and 0.12 9 of Borchie catalyst (catalyst VP 0244 from Borchers GmbH) are introduced as an initial charge and heated to 80° C. Over the course of 1 h, 150.00 g of isocyanatomethyl-trimethoxysilane are added dropwise and the mixture is stirred at 80° C. for 1 h. $^1$H NMR and IR spectroscopy show that the isocyanatosilane has undergone full reaction.

Example 8

Preparation of $SiO_2$ Nanoparticles with Protected Isocyanate Groups and of a Coating Formulation Comprising these Particles 2.20 g of the protected isocyanatosilane prepared in example 7 are admixed dropwise over the course of 30 min with 33.30 g of an $SiO_2$ organosol (IPA-ST from Nissan Chemicals, 30% by weight $SiO_2$, 12 nm). 0.33 g of water is added to the highly viscous mixture, and the pH of the dispersion is adjusted to 3 using trifluoroacetic acid. The mixture is subsequently stirred at room temperature for 24 h. After 22.00 g of methoxypropanol have been added, the isopropanol present is distilled off to an $SiO_2$ content of 37%. The amount of protected NCO groups in the mixture is 0.34 mmol/g. 26.0 g of the dispersion are mixed with 20.0 g of the solution prepared according to example 6, containing protected isocyanates, in butyl acetate, and that mixture is stirred at room temperature for 24 h. The amount of protected isocyanate groups in the dispersion is 1.05 mmol protected NCO/g.

A coating is produced by mixing 4.82 g of the above-described dispersion, containing $SiO_2$ nanoparticles with protected isocyanate functions, with 2.93 g of Desmophen® A 365 BA/X from Bayer (acrylate-based paint polyol having a hydroxyl group content of 1.71 mmol OH/g). This corresponds to a molar ratio of protected isocyanate functions to hydroxyl groups of 1.1:1. The resulting coating material exhibits a slight Tyndall effect. Otherwise it is clear.

Comparative Example 3

The procedure of example 8 is repeated, but instead of the dispersion containing $SiO_2$ nanoparticles having protected isocyanate functions, the pure protected isocyanate of example 6 is used. The amount of this is adapted accordingly, to give a molar ratio of protected isocyanate functions to hydroxyl groups of 1.1:1. In other words, 2.80 g of the protected isocyanate from example 6 are used to 2.93 g of polyol (Desmophen® A 365 BA/X from Bayer).

Example 9

Production and Evaluation of Coating Films

The coating materials from example 8 and from comparative example 3 are each knife-coated using a Coatmaster® 509 MC film-drawing device from Erichsen, with a knife with a slot height of 120 μm, to a glass plate. The coating films obtained are then dried in a forced-air drying cabinet at 140° C. for 60 minutes. Both from the coating formulations of example 8 and from those of comparative example 3, coatings are obtained which are visually flawless, smooth. The gloss of all three coatings, determined using a Micro gloss 20° gloss meter from Byk, is approximately 145 gloss units for all three coating materials.

The scratch resistance of the cured coating films thus produced is determined using a Peter-Dahn abrasion-testing instrument. For this purpose a Scotch Brite® 2297 nonwoven with an area of 45×45 mm is loaded with a weight of 500 g and used for scratching with 40 strokes. Both before the beginning and after the end of the scratch tests, the gloss of the respective coating is measured using a Micro gloss 20® gloss meter from Byk. As a measure of the scratch resistance of the respective coating, the loss of gloss was ascertained:

TABLE 2

| Loss of gloss in the Peter-Dahn scratch test: | |
| --- | --- |
| Coating sample | Loss of gloss |
| Example 8 | 48% |
| Comparative example 3 | 70% |

Example 10

Preparation of Fumed Silica Modified with Blocked Isocyanate Groups

At a temperature of 25° C., under $N_2$ inert gas, 100 g of fumed hydrophilic silica, with a moisture content of less than 1% and an HCl content of less than 100 ppm, and with a specific surface area of 300 m²/g (measured by the BET method in accordance with DIN 66131 and 66132) (available under the name WACKER HDK T30 from Wacker-Chemie GmbH, Munich, D), are admixed via a one-fluid nozzle (pressure: 5 bar) with 66 g of the protected isocyanatosilane described in example 7 and 10 ml of water, in very finely divided form. The silica thus loaded is subsequently fluidized at a temperature of 25° C. under $N_2$ for 2 h and then reacted under $N_2$ for 2 h at 100° C. in a 100 l drying cabinet. This gives a white silica powder with a homogeneous layer of silylating agent.

The analytical data are listed in table 3.

TABLE 3

| Analytical data of silica from example 10: | | | |
| --- | --- | --- | --- |
| Example | % C | BET [m²/g] | pH |
| 10 | 13.1 | 180 | 5.1 |

Description of the Analytical Methods
1. Carbon Content (% C)
   Elemental analysis for carbon; combustion of the sample at more than 1000° C. in a stream of $O_2$, detection and quantification of the resulting $CO_2$ by IR; instrument: LECO 244
2. BET
   measured by the BET method in accordance with DIN 66131 and 66132
3. pH
   4% (by weight) suspension of silica in saturated aqueous sodium chloride solution:methanol=50:50

Example 11

Preparation of a Coating Formulation Comprising a Fumed Silica Modified by Blocked Isocyanate Groups To produce a coating, 8.56 g of Desmophen® A 365 BA/X from Bayer (acrylate-based paint polyol with a hydroxyl group content of 1.71 mmol OH/g) are mixed with 6.33 g of Desmodur® BL 3175 SN from Bayer (methyl ethyl ketone oxime-blocked polyisocyanate, blocked NCO content approximately 11%). This corresponds to a molar ratio of protected isocyanate functions to hydroxyl groups of 1.1:1. Additionally, 0.05 g of a 50% strength dibutyltin dilaurate solution (in methyl ethyl ketone) and 0.01 g of ADDID® 100 from Wacker-Chemie GmbH (flow control assistant based on polydimethylsiloxane) and also 3.15 g of methyl ethyl ketone are mixed in, giving a coating formulation with a solids content of approximately 50%. Incorporated into the resulting mixture by means of a dissolver are 1.8 g of the fumed silica obtained from example 10 and modified with blocked isocyanate groups, giving a clear coating formulation.

Comparative Example 4

The procedure described in example 11 is repeated, but without the incorporation of the modified fumed silica.

Example 12

Production and Evaluation of Coating Films

The coating materials from example 11 and from comparative example 4 are each knife-coated using a Coatmaster® 509 MC film-drawing device from Erichsen, with a knife with a slot height of 100 μm, to a glass plate. The coating films obtained are then dried in a forced-air drying cabinet at 160° C. for 30 minutes. Both from the coating formulations of example 11 and from those of comparative example 4, coatings are obtained which are visually flawless, smooth. The gloss of the coatings, determined using a Micro gloss 20° gloss meter from Byk, is approximately 145 gloss units in the case of the formulation from the example, and approximately 170 gloss units in the case of comparative example 4.

The scratch resistance of the cured coating films thus produced is determined using a Peter-Dahn abrasion-testing instrument. For this purpose a Scotch Brite® 2297 nonwoven with an area of 45×45 mm is loaded with a weight of 500 g and used for scratching with 50 strokes. Both before the beginning and after the end of the scratch tests, the gloss of the respective coating is measured using a Micro gloss 20® gloss meter from Byk. As a measure of the scratch resistance of the respective coating, the loss of gloss was ascertained:

TABLE 4

| Loss of gloss in the Peter-Dahn scratch test: | |
|---|---|
| Coating sample | Loss of gloss |
| Example 11 | 33% |
| Comparative example 4 | 65% |

The invention claimed is:

1. Particles (P) comprising a core comprising metal atoms, silicon atoms, or metal and silicon atoms, together with oxygen atoms, or a core comprising silicone resin, the particles possessing at least one protected isocyanate group on their surface, the particles (P) prepared by reacting particles (P1) comprising metal atoms, silicon atoms, or silicon and metal atoms, together with oxygen atoms, or comprising a silicone resin, the particles (P1) possessing free hydroxyl functions, with organosilanes (A1) to give, as an intermediate, NH-, OH- or SH-functional particles (P2), which in a further reaction step are reacted with a compound (A2) which possesses not only at least one protected isocyanate function but also an unprotected isocyanate function, to give the particles (P), wherein the organosilanes (A1) are of the formulae (II), (IIa), (III), (IIIa) or (IX)

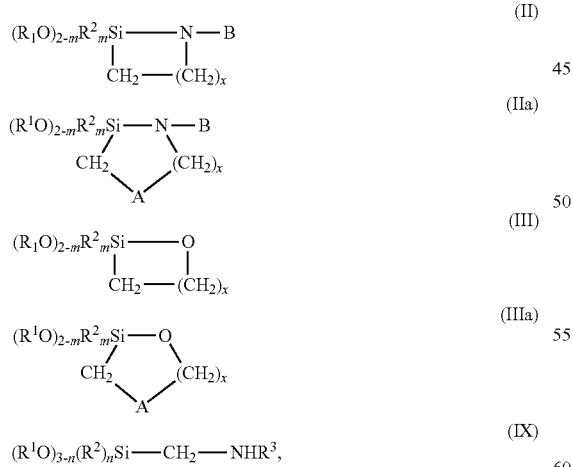

(II)

(IIa)

(III)

(IIIa)

$(R^1O)_{3-n}(R^2)_n Si$—$CH_2$—$NHR^3$, (IX)

the aminoalkyl- or hydroxyalkyl-functional particles (P2) obtained as an intermediate in that reaction being reacted in a $2^{nd}$ reaction step with a part-protected isocyanate (A2) of the general formula (XII)

OCN—Y—(NH—C(O)—X)$_z$ (XII)

to give the particles (P), wherein
$R^1$ is hydrogen, alkyl, cycloalkyl or aryl radical having 1 to 6 C atoms, the carbon chain optionally interrupted by nonadjacent oxygen, sulfur or $NR^3$ groups,
$R^2$ is alkyl, cycloalkyl, aryl or arylalkyl radical having 1 to 12 C atoms, the carbon chain optionally interrupted by nonadjacent oxygen, sulfur or $NR^3$ groups,
$R^3$ is a hydrogen, alkyl, cycloalkyl, aryl, arylalkyl, aminoalkyl or aspartate ester radical,
X is a protective group which is eliminated at temperatures below 300° C. in the form of HX, and in being eliminated liberates an isocyanate function, and
n is 0, 1 or 2,
Y is a (z+1)-functional aliphatic or aromatic radical,
m is 0, 1,or 2,
x is between 1 to 10,
A is oxygen, sulfur, a group of the formula $NR^3$ or a nitrogen atom which is part of a heterocyclic ring, and
B is hydrogen or a carbon-containing radical.

2. The particles (P) of claim 1, wherein organosilanes (A1) are used which possess a reactive silyl function of the formulae (II) or (IIa)

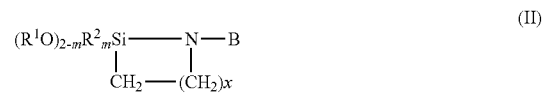

(II)

(IIa)

where
B is hydrogen or a carbon-containing radical,
m is 0, 1 or 2, and
x has a value between 0 and 10,
A is oxygen, sulfur, a group of the formula $NR^3$ or a nitrogen atom which is part of a heterocyclic ring,
$R^1$ is a hydrogen, alkyl, cycloalkyl or aryl radical having 1 to 6 C atoms, the carbon chain optionally interrupted by nonadjacent oxygen, sulfur or $NR^3$ groups,
$R^2$ is an alkyl, cycloalkyl, aryl or arylalkyl radical having 1 to 12 C atoms, the carbon chain optionally interrupted by nonadjacent oxygen, sulfur or $NR^3$ groups, and
$R^3$ is a hydrogen, alkyl, cycloalkyl, aryl, arylalkyl, aminoalkyl or aspartate ester radical.

3. The particles (P) of claim 1, wherein organosilanes (A1) used are compounds of the formulae (III) or (IIIa)

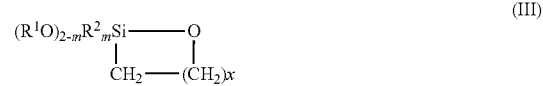

(III)

(IIIa)

where
m is 0, 1 or 2, and
x has a value between 0 and 10,
A is oxygen, sulfur, a group of the formula $NR^3$ or a nitrogen atom which is part of a heterocyclic ring,
$R^1$ is a hydrogen, alkyl, cycloalkyl or aryl radical having 1 to 6 C atoms, the carbon chain optionally interrupted by nonadjacent oxygen, sulfur or $NR^3$ groups, R² is an alkyl, cycloalkyl, aryl or arylalkyl radical having 1 to 12 C atoms, the carbon chain optionally interrupted by nonadjacent oxygen, sulfur or NR³ groups, and R³ is a hydrogen, alkyl, cycloalkyl, aryl, arylalkyl, aminoalkyl or aspartate ester radical.

4. The particles (P) of claim 1, prepared by reacting particles (P1) with organosilanes (A1) of the formula (XIV),

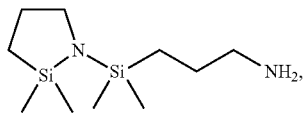

(XIV)

the aminoalkyl-functional particles (P2) obtained as an intermediate in that reaction being reacted in a 2$^{nd}$ reaction step with a part-protected isocyanate (A2) of the general formula (XII) to give the end product (P).

5. The particles (P) of claim 1, wherein colloidal silicon oxides or metal oxides are used as particles (P1).

6. The particles (P) of claim 1, wherein fumed silica is used as particles (P1).

7. A coating formulation comprising particles (P) of claim 1.

8. The coating formulation of claim 7, containing 0-90% by weight, based on the solids fraction, of a coating-material curative possessing protected or unprotected NCO functions, 20-90% by weight, based on the solids fraction, of a hydroxyl-functional film-forming resin, and 3-40% by weight, based on the solids fraction, of particles (P).

9. The particles (P) of claim 1, wherein the protective groups are selected from the group consisting of butanone oxime, 3,5-dimethylpyrazole, caprolactam, dimethyl malonate, diethyl malonate, ethyl acetoacetate, diisopropylamine, pyrrolidone, 1,2,4-triazole, imidazole, 2-isopropylimidazole, and mixtures thereof.

10. The particles (P) of claim 1, wherein the protective groups are selected from the group consisting of diethyl malonate, butanone oxime, dimethyl malonate, diisopropylamine, 3,5-dimethylpyrazole, 2-isopropylimidazole, and mixtures thereof.

11. Particles (P) comprising a core comprising metal atoms, silicon atoms, or metal and silicon atoms, together with oxygen atoms, or a core comprising silicone resin, the particles possessing at least one protected isocyanate group on their surface, the particles (P) prepared by reacting particles (P1) comprising metal atoms, silicon atoms, or silicon and metal atoms, together with oxygen atoms, or comprising a silicone resin, the particles (P1) possessing free hydroxide functions, with organosilanes (A) of the formula (VI)

$$(R^1O)_{3-n}(R^2)_n Si-CH_2-NH-C(O)-X \qquad (VI)$$

where

R¹ is a hydrogen, alkyl, cycloalkyl or aryl radical having 1 to 6 C atoms, the carbon chain optionally interrupted by nonadjacent oxygen, sulfur or NR³ groups, R² is an alkyl, cycloalkyl, aryl or arylalkyl radical having 1 to 12 C atoms, the carbon chain optionally interrupted by nonadjacent oxygen, sulfur or NR³ groups.

X is a protective group which is eliminated at temperatures between 80 and 300° C. in the form of HX, and in being eliminated liberates an isocyanate function, R³ is a hydrogen, alkyl, cycloalkyl, aryl, arylalkyl, aminoalkyl or aspartate ester radical, and n is 0, 1, or 2.

12. Particles (P) comprising a core comprising silicone resin, the particles possessing at least one protected isocyanate group on their surface, the particles (P) being prepared by reacting particles (P1) comprising silicone resin, the particles (P1) possessing at least one free hydroxyl function, with a) organosilanes (A) which contain at least one protected isocyanate function, or b) with organosilanes (A1) which possess at least one NH, OH or SH function, to give, as an intermediate, NH-, OH- or SH-functional particles (P2), which in a further reaction step are reacted with a compound (A2) which possesses not only at least one protected isocyanate function but also an unprotected isocyanate function, to give the particles (P), the organosilanes (A) and (A1), prior to their reaction with the particles (P1), either possessing an oxygen atom, sulfur atom or nitrogen atom in a position a to the silyl group of the organosilane, or possessing an Si—O or Si—N moiety which are part of a cyclic structure, the protective group of the protected isocyanate being eliminated at a temperature of 300° C. or less, wherein the silicone resin is of the formula (V)

$$(R^5_3SiO_{1/2})_e(R^5_2SiO_{2/2})_f(R^5SiO_{3/2})_g(SiO_{4/2})_h \qquad (V)$$

where

R⁵ is an OR¹ function, an OH function, an optionally halogen-, hydroxyl-, amino-, epoxy-, thiol-, (meth)acryloyl-, or else NCO-substituted hydrocarbon radical having 1-18 carbon atoms, e is greater than or equal to 0, f is greater than or equal to 0, g is greater than or equal to 0, h is greater than or equal to 0, and the sum of e+f+g+h is at least 1, wherein at least one R⁵ which is hydroxyl is present.

* * * * *